(12) United States Patent
Neu

(10) Patent No.: US 10,371,118 B2
(45) Date of Patent: Aug. 6, 2019

(54) DEVICE AND METHOD FOR CONVERTING AND STORING ELECTRICAL ENERGY IN THE FORM OF COMPRESSED AIR

(71) Applicant: SEGULA ENGINEERING FRANCE, Nanterre (FR)

(72) Inventor: Thibault Neu, Chateau Thebaud (FR)

(73) Assignee: SEGULA ENGINEERING FRANCE, Nanterre (FR)

(*) Notice: Subject to any disclaimer, the term of this patent is extended or adjusted under 35 U.S.C. 154(b) by 59 days.

(21) Appl. No.: 15/578,061

(22) PCT Filed: Jun. 1, 2016

(86) PCT No.: PCT/EP2016/062410
§ 371 (c)(1),
(2) Date: Nov. 29, 2017

(87) PCT Pub. No.: WO2016/193322
PCT Pub. Date: Dec. 8, 2016

(65) Prior Publication Data
US 2018/0156185 A1  Jun. 7, 2018

(30) Foreign Application Priority Data

Jun. 1, 2015 (FR) ..................... 15 54931

(51) Int. Cl.
*F01D 15/10* (2006.01)
*F02C 6/00* (2006.01)
(Continued)

(52) U.S. Cl.
CPC ............... *F03B 13/06* (2013.01); *F03B 3/10* (2013.01); *H02K 7/1823* (2013.01); *E02B 9/06* (2013.01);
(Continued)

(58) Field of Classification Search
CPC ............ F03B 13/06; F03B 3/10; F03B 3/103
See application file for complete search history.

(56) References Cited

U.S. PATENT DOCUMENTS 2,366,388 A * 1/1945 Crosby ................... F15B 11/17
                                                        417/219
2,433,896 A * 1/1948 Gay ......................... B65G 5/00
                                                        290/2
(Continued)

FOREIGN PATENT DOCUMENTS

FR   2196015 A5 * 3/1974 ............. F03B 13/06
GB   2013318 A     8/1979
(Continued)

OTHER PUBLICATIONS

French Search Report from French Patent Application No. 1554931, dated May 24, 2016.
(Continued)

*Primary Examiner* — Tulsidas C Patel
*Assistant Examiner* — Thomas K Quigley
(74) *Attorney, Agent, or Firm* — Greer, Burns & Crain, Ltd.

(57) ABSTRACT

A device and method for converting electric energy into pneumatic energy and vice versa, which involves: pumping a liquid forming a liquid piston into a conversion chamber in which a quantity of air is trapped until the air reaches a pressure of a compressed air storage vessel; or churning a liquid by expanding the compressed air in a conversion chamber which is filled with a quantity of liquid, in which device or method the pumping or the churning of the water takes place in the same conversion chamber and consecutively in at least two pumping or churning stages, respectively, provided so as to operate in different pressure ranges.
(Continued)

The present device and method can be used in particular in the field of converting and storing electric energy.

19 Claims, 3 Drawing Sheets

(51) Int. Cl.
    *F03B 13/06* (2006.01)
    *F03B 3/10* (2006.01)
    *H02K 7/18* (2006.01)
    *E02B 9/06* (2006.01)

(52) U.S. Cl.
    CPC ....... *F05B 2220/32* (2013.01); *F05B 2240/40* (2013.01); *F05B 2240/95* (2013.01); *F05B 2260/42* (2013.01); *Y02E 10/22* (2013.01); *Y02E 10/223* (2013.01); *Y02E 60/17* (2013.01)

(56) References Cited

U.S. PATENT DOCUMENTS

| | | | | |
|---|---|---|---|---|
| 3,538,340 A * | 11/1970 | Lang | .............. | E21B 43/28 166/305.1 |
| 3,939,356 A * | 2/1976 | Loane | .............. | F02C 6/16 290/52 |
| 4,496,846 A * | 1/1985 | Parkins | .............. | F03D 7/02 290/44 |
| 5,431,545 A * | 7/1995 | Knight | .............. | B08B 9/0551 417/248 |
| 5,461,858 A * | 10/1995 | Johnson | .............. | F01K 27/005 60/325 |
| 6,718,761 B2 * | 4/2004 | Merswolke | .............. | F03D 9/008 60/398 |
| 7,579,700 B1 * | 8/2009 | Meller | .............. | F03B 17/005 290/1 A |
| 7,735,506 B2 * | 6/2010 | Horton, III | .............. | B65D 88/78 137/1 |
| 7,743,609 B1 * | 6/2010 | Brostmeyer | .............. | F02C 6/16 60/398 |
| 7,832,207 B2 * | 11/2010 | McBride | .............. | F15B 1/024 60/410 |
| 8,539,763 B2 * | 9/2013 | McBride | .............. | F01B 23/00 60/509 |
| 9,188,114 B2 * | 11/2015 | Kuttler | .............. | F04B 1/145 |
| 2007/0151234 A1 * | 7/2007 | Lampkin, III | .......... | F03B 13/06 60/398 |
| 2009/0113888 A1 * | 5/2009 | Kuttler | .............. | F04B 1/145 60/486 |
| 2010/0253080 A1 * | 10/2010 | Deangeles | .............. | F03B 13/06 290/52 |
| 2011/0062166 A1 * | 3/2011 | Ingersoll | .............. | F02G 1/044 220/581 |
| 2011/0296823 A1 * | 12/2011 | McBride | .............. | F15B 1/024 60/407 |
| 2012/0174569 A1 * | 7/2012 | Ingersoll | .............. | F02C 6/16 60/327 |
| 2014/0026547 A1 * | 1/2014 | Kim | .............. | F15B 15/00 60/327 |
| 2014/0091574 A1 * | 4/2014 | Favy | .............. | F02C 6/16 290/52 |
| 2014/0216022 A1 * | 8/2014 | Jiang | .............. | F15B 1/04 60/327 |
| 2015/0176559 A1 * | 6/2015 | Hongawa | .............. | F03B 3/10 60/398 |
| 2015/0361948 A1 | 12/2015 | Schmidt-Boecking et al. | | |
| 2015/0362124 A1 * | 12/2015 | Favy | .............. | F02C 6/16 206/0.6 |

FOREIGN PATENT DOCUMENTS

| | | | | |
|---|---|---|---|---|
| GB | 2528449 A | * | 1/2016 | ............... F01K 3/12 |
| JP | S58-178878 A | | 10/1983 | |
| JP | H03-294662 A | | 12/1991 | |
| JP | 11173252 A | * | 6/1999 | ............. F03B 13/06 |

OTHER PUBLICATIONS

International Search Report from corresponding International Patent Application No. PCT/EP2016/062410, dated Oct. 4, 2016.
Lemofouet et al., "Le Stockage Hydropneumatique D'énergie HyPES", Electrosuisse Bulletin (Sep. 2011), pp. 38-42.

* cited by examiner

|     | 1/6 | 2/6 | 3/6 | 4/6 | 5/6 | 6/6 |
|-----|-----|-----|-----|-----|-----|-----|
| CH1 | PT1 | PT2 | PT3 | P1  | P1  | P1  |
| CH2 | PT2 | PT3 | P2  | P2  | P2  | PT1 |
| CH3 | PT3 | P3  | P3  | P3  | PT1 | PT2 |
| CH4 | P1  | P1  | P1  | PT1 | PT2 | PT3 |
| CH5 | P2  | P2  | PT1 | PT2 | PT3 | P2  |
| CH6 | P3  | PT1 | PT2 | PT3 | P3  | P3  |

|     | 1/18 | 2/18 | 3/18 | 4/18 | 5/18 | 6/18 | 7/18 | 8/18 | 9/18 | 10/18 | 11/18 | 12/18 | 13/18 | 14/18 | 15/18 | 16/18 | 17/18 | 18/18 |
|-----|------|------|------|------|------|------|------|------|------|-------|-------|-------|-------|-------|-------|-------|-------|-------|
| CH1 | PT1  | PT1  | -    | PT2  | PT2  | -    | PT3  | PT3  | PT3  | P1    | P1    | P1    | P1    | P1    | P1    | P1    | P1    | P1    |
| CH2 | -    | PT2  | PT2  | -    | PT3  | PT3  | P2   | P2   | P2   | P2    | P2    | P2    | P2    | P2    | P2    | PT1   | PT1   | PT1   |
| CH3 | PT2  | -    | PT3  | PT3  | PT3  | P3   | P3   | P3   | P3   | P3    | P3    | P3    | PT1   | PT1   | PT1   | -     | PT2   | PT2   |
| CH4 | PT3  | PT3  | PT3  | P1   | P1   | P1   | P1   | P1   | P1   | P1    | PT1   | PT1   | PT1   | -     | PT2   | PT2   | -     | PT3   |
| CH5 | P2   | P2   | P2   | P2   | P2   | P2   | PT1  | PT1  | PT1  | -     | PT2   | PT2   | -     | PT3   | PT3   | PT3   | PT3   | P2    |
| CH6 | P3   | P3   | P3   | PT1  | PT1  | PT1  | -    | PT2  | PT2  | -     | PT3   | PT3   | PT3   | P3    | P3    | P3    | P3    | P3    |

DEVICE AND METHOD FOR CONVERTING AND STORING ELECTRICAL ENERGY IN THE FORM OF COMPRESSED AIR

BACKGROUND

The present invention relates to a device for converting energy of electrical origin and storing energy in the form of compressed air using a liquid environment, in particular the aquatic environment.

The present invention also relates to a method for conversion between the electrical and, respectively, aeraulic forms of energy.

Such a device makes it possible to convert electrical energy easily and efficiently into stored aeraulic energy and vice versa in order to be distributed over the grid. The invention applies in particular to the field of the conversion of electrical energy and the storage thereof once converted into a form capable of long-term storage, in this case the form of compressed air.

The production of electricity is a vital issue of our time. Production technologies based on renewable energy sources have been developed, on the one hand, to diversify the sources for supplying energy and, on the other hand, to produce electrical energy in an ecological manner. However, the need of consumers for electricity does not necessarily coincide with the production of electricity from renewable sources such as solar or wind power. The problem then arises of storing the electrical energy when it cannot be consumed directly by the consumers via the electrical distribution grid. Now electricity can only be stored when converted into another form of energy, then it has to be converted back into electricity when released in order to supply power to the electrical distribution grid when the latter demands it. These essential transformations between forms of energy are subject to energy losses, which should be minimized.

Different energy conversion and storage devices are known, in which the electrical energy is converted then stored in the form of compressed air. The electricity typically originating from solar panels or wind turbines is conveyed to a device located partially on the surface of an aquatic environment and partially submerged in said aquatic environment. The transformation of the electrical energy is carried out using this electricity as an energy source for compressing air, which is sent into a reservoir kept under substantially constant pressure owing to the hydrostatic pressure prevailing at the submerged depth of the reservoir. For the compression, rather than using a compressor driven directly by an electric motor, a system for pumping a liquid which fills, from below, a conversion chamber in which the air to be compressed is trapped in the upper part is preferably used. This manner of compression has the advantage of being quasi-isothermal. The liquid originates from an external environment such as the aquatic environment or originates from a reservoir. The trapped air is compressed up to a predetermined pressure by pumping liquid into the conversion chamber, the liquid forming a liquid piston for compression. The compressed air is then transferred to the reservoir for storing compressed air. Then the liquid is replaced with low-pressure air in the conversion chamber and a new conversion cycle can begin.

When the grid demands electrical energy, the energy stored in the form of compressed air is converted back into electricity. The compressed air of the storage reservoir is transferred to the conversion chamber initially filled with liquid. The compressed air expands in the conversion chamber and pushes the liquid through a dynamo-hydraulic machine, such as a turbine, coupled to an electric generator supplying power to the grid.

However, these devices are deficient in terms of efficiency. The pumps and the turbines work under a very small pressure difference at the start of pumping and at the end of turbining, and thus have to ensure a very high throughput in order for their power to be significant. Conversely, at the end of pumping and at the start of turbining, the difference between the high and the low pressure of the pump or the turbine is great and therefore the throughput is much lower, for a given electrical power. The dynamo-hydraulic machines (pumps or turbines or reversible pump-turbines) cannot be optimized for all of these very varied operating conditions.

The problem is complicated by the need for the conversion of electrical energy into another form or vice versa to be carried out, from an electrical point of view, at a power that fluctuates as little as possible, so as to facilitate the taking or returning of the electrical energy from or to the grid.

The article "Le stockage hydropneumatique d'énergie HyPES" [Hydro-pneumatic energy storage, HyPES] by Dr. Sylvain LEMOFOUET and Prof. Alfred RUFER, Bulletin 9/2011 Electrosuisse pages 38 to 42, describes a mechanical-pneumatic conversion device having a hydropneumatic system comprising several stages with different cylinder capacities. "Each stage is essentially constituted by a hydraulic motor pump with variable throughput, a hydraulic directional module and a compression/expansion chamber with integrated heat exchanger." This device comprises many elements, its price and maintenance are relatively high, and it is complex to install.

The purpose of the present invention is to overcome, completely or partially, at least one of the above-described problems through a novel device for converting electrical energy into pneumatic energy and vice versa.

A purpose of the invention is to produce a device with a good cost-efficiency ratio.

Another purpose of the invention is to limit the energy losses.

Another purpose of the invention is to propose a device providing electrical energy in such a way that the power fluctuation due to the mode of conversion is small.

Yet another purpose of the invention is to propose a machine comprising a reduced number of parts and/or components.

SUMMARY

These objectives are achieved with an energy conversion device for converting electrical energy into pneumatic energy and for storing this in the form of compressed air.

According to the invention, the device for converting electrical energy into aeraulic energy and vice versa, and for storing this in the form of compressed air, the device comprising:
- dynamo-electric machines which have an electrical power link to a grid,
- dynamo-hydraulic machines mechanically linked to the dynamo-electric machines,
- at least one conversion chamber capable on the one hand of containing liquid pumped by the dynamo-hydraulic machines operating as pumps or receiving liquid intended to supply power to the dynamo-hydraulic machines operating as expanders, and on the other hand of containing air, such that the liquid present in the chamber forms a liquid piston for compression or expansion of air, a reservoir for storing compressed air at a storage pressure, sealable means for bidirectional aeraulic communication between the conversion chambers and the storage reservoir, is characterized in that each dynamo-hydraulic machine is provided in order to operate within a respective pressure range at its high-pressure opening in order to carry out the pumping or the hydraulic expansion in stages inside each conversion chamber successively with several said dynamo-hydraulic machines up to or, respectively, from the desired storage pressure, the pressure range being narrower than the difference between the low pressure and the storage pressure, and in that distribution means are provided in order to connect each conversion chamber successively to at least two dynamo-hydraulic machines provided in order to operate within different pressure ranges.

With the pumping or the hydraulic expansion in stages successively by at least two dynamo-electric machines calibrated differently in terms of pressure, it is possible to optimize each dynamo-hydraulic machine for the pressure range within which it will operate.

In an embodiment, at least one dynamo-hydraulic machine is provided in order to operate within a narrow pressure range substantially corresponding to the pressure of the storage reservoir. Given that one part of the pumping and one part of the hydraulic expansion are carried out at a substantially stabilized pressure during the transfers between reservoir and conversion chamber, it is advantageous for at least one of the dynamo-hydraulic machines to be calibrated for this pressure.

Advantageously, the dynamo-hydraulic machines are mounted hydraulically in parallel with each other between a low-pressure liquid source and the at least one conversion chamber.

The storage reservoir is preferably underwater and open in the lower part to receive water from the aquatic environment, enclosing a pocket of air at a pressure defined by the submersion depth of the reservoir. A reservoir capable of having a very large capacity subjected to a stable pressure and which need not have a mobile part or deformable wall is thus produced in a simple and reliable manner. The level of the water in the reservoir serves as deformable wall, adjusting as a function of the quantity of compressed air stored.

Typically, to carry out the conversion of the electrical energy into aeraulic energy and vice versa, several cycles of pumping or turbining respectively are provided, each cycle passing through the successive pressure ranges. It is thus possible to use a much smaller conversion chamber, for example 100 times smaller than the storage reservoir.

In an embodiment, the device comprises at least two conversion chambers in order to continuously maintain the energy flow in the dynamo-hydraulic machines. When one conversion chamber is in the resetting phase (discharge of water in anticipation of a new compression cycle or filling with water in anticipation of a new expansion cycle), the other can continue to be active in terms of energy.

Advantageously, the cycles of varying the level of liquid in the conversion chambers the phase of which is shifted between conversion chambers, each dynamo-hydraulic machine being connected successively to several conversion chambers which have a time offset within the pressure range corresponding to this dynamo-hydraulic machine. This can thus be done such that the dynamo-hydraulic machines operate in a quasi-permanent or permanent manner successively with the different conversion chambers.

According to an embodiment, a pause is provided at the time when the at least one conversion chamber passes from one dynamo-hydraulic machine to another.

Hydraulic readjustment means, in particular low-pressure pumps, can be provided to readjust the level of liquid to its initial state in order to carry out the pumping or the turbining in the at least one conversion chamber.

Preferably, the device comprises more conversion chambers than dynamo-hydraulic machines. At all times, the conversion chambers which are not linked to any dynamo-hydraulic machine can be in the resetting phase, or in the pause phase between two stages of compression or expansion.

In a preferred embodiment, the dynamo-hydraulic machines are of the pump-turbine type capable of operating as a pump or, conversely, as a turbine. They are even more preferably of the Kaplan or Deriaz type.

Preferably, the dynamo-electric machines are reversible motor-generators, operating as motors for storing aeraulic energy in the reservoir and as a generator for producing electricity during the release from aeraulic storage.

Advantageously, the bidirectional communication means are closed, except for during a final phase of compression and during an initial phase of expansion.

According to a second aspect of the invention, the method for converting electrical energy into pneumatic energy and vice versa, in which:

a liquid is pumped, forming a liquid piston in a conversion chamber in which a quantity of air is trapped until this air reaches a pressure of a compressed air storage reservoir, then the compressed air is transferred from the conversion chamber to the storage reservoir, and/or a liquid is turbined by allowing compressed air to enter a conversion chamber containing a quantity of liquid such that the liquid is pushed through a turbine, is characterized in that the pumping or the turbining of the liquid is carried out successively at least in two stages of pumping or, respectively, turbining provided to take place within different pressure ranges.

In a preferred version of the method, during turbining and after having allowed a quantity of compressed air to enter the conversion chamber still containing water, the inlet for compressed air originating from the storage reservoir is closed, and the compressed air present in the conversion chamber is expanded, while the remaining liquid is pushed back in order to be turbined. It is thus possible to expand, as completely as desired, each basic quantity of compressed air admitted in the conversion chamber in each cycle, and with an excellent energy efficiency owing to the expansion in stages according to the invention.

Preferably:

the liquid is pumped by dynamo-hydraulic machines driven by at least one electric motor operating with electrical energy originating from an electricity grid, the liquid is turbined by dynamo-hydraulic machines which drive an electric generator in order to generate electrical energy returned to the grid.

In a version of the method:

during pumping and after having transferred the compressed air into the storage reservoir, the liquid contained in the conversion chamber is drained, during turbining and after having expanded the air contained in the conversion chamber, said chamber is filled with liquid again.

Preferably, arrangements are made for the compression of the air and/or the expansion of the air in the at least one conversion chamber to be quasi-isothermal. For example, heat conductors are placed vertically in the conversion chambers in order that they transfer the calories generated in the air by the compression to the water, and that they transfer calories taken from the water during the expansion to the air. These conductors can be a bundle of vertical tubes open at both ends and extending over substantially the whole height of the conversion chamber.

Optionally, the device can comprise supercapacitors to regulate the power that the device exchanges with the grid.

It can also be provided to store the energy within a cycle via the kinetic energy stored on the drive shaft. The use of a part of the kinetic energy available in the existing rotation of the rotating machines (for example, in the storage phase, the motors and pumps) is envisaged. An additional flywheel mass will also be able to be added on the mechanical transmission shaft in order to increase this storage of kinetic energy within a cycle.

Moreover, it is possible to re-use the liquid from one cycle to carry out other cycles with the same mass of liquid. This feature makes it possible to carry out energy conversions in a more ecological manner by limiting the volumes of water trapped and expelled by the device.

BRIEF DESCRIPTION OF THE DRAWINGS

Other advantages and characteristics of the invention will become apparent on examination of the detailed description of embodiments which are in no way limitative, and the attached drawings, in which.

DETAILED DESCRIPTION.

As these embodiments are in no way limitative, variants of the invention can be considered comprising only a selection of the characteristics described hereinafter, in isolation from the other characteristics described (even if this selection is isolated within a phrase containing other characteristics), if this selection of characteristics is sufficient to confer a technical advantage or to differentiate the invention with respect to the state of the art. This selection comprises at least one, preferably functional, characteristic without structural details, and/or with only a part of the structural details if this part alone is sufficient to confer a technical advantage or to differentiate the invention with respect to the state of the prior art.

First of all, with reference to FIGS. 1 and 2, a device for converting electrical energy into aeraulic energy and vice versa will be described. One of the preferred embodiments is a device for converting and storing electrical energy in the sea. It has the objective of absorbing the electrical surpluses in order to convert and store them in the form of aeraulic energy, then to convert the aeraulic energy back into electrical energy so as to return it to the grid when the grid demands it. Between these two active phases, the energy is stored in the form of compressed air in at least one underwater, typically subsea, storage reservoir 20 at a storage pressure.

Figure 1:
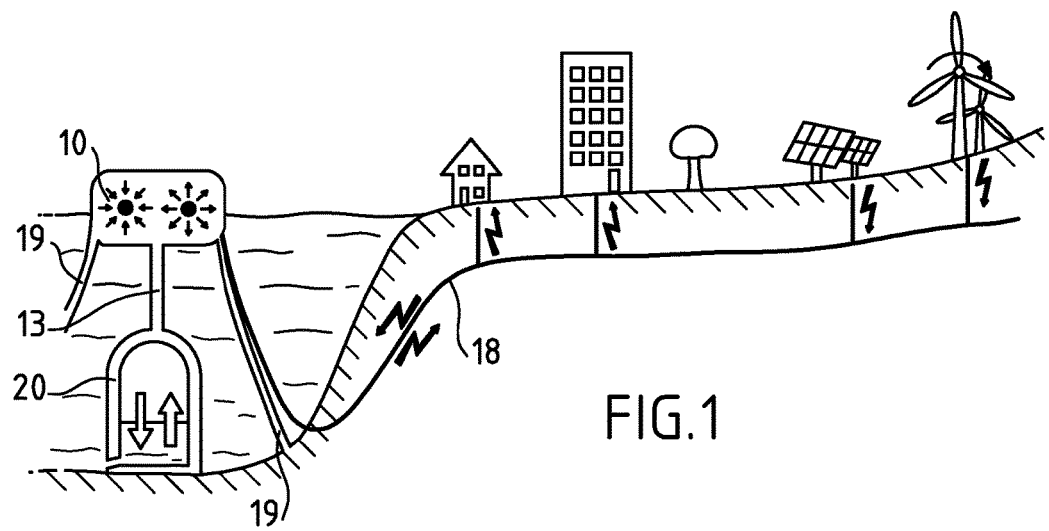
FIG. 1 is a diagrammatic view of the device for converting electrical energy into aeraulic energy.

According to a preferred embodiment and with reference to FIG. 1, the subsea storage reservoir 20 is open in the lower part in order to communicate with the aquatic environment and, in the upper part, above the water level in the reservoir, encloses a pocket of compressed air at a desired pressure defined by the submersion depth of the reservoir. Preferably, the reservoir is constituted by several contiguous cells, firmly fixed together. Typically, the reservoir is placed on the bottom of the stretch of water, typically the seabed. A typical submersion depth is comprised between 70 and 200 m, preferably in the order of 100 m.

With reference to FIG. 1, the energy conversion device is placed on a floating platform 10. The floating platform groups together the electromechanical, hydromechanical and hydropneumatic conversion systems as well as the associated electrical and electronic systems in order to allow the conversion of electrical energy into pneumatic (also called aeraulic) energy and vice versa. A summary of the main parts of these items of equipment is shown in FIG. 2. The platform is linked to the electricity grid by high-voltage undersea power cable 18. The position of the platform on the surface above the tanks 20 for storing the compressed air is maintained using a set of permanent anchorage lines 19.

The energy conversion device comprises dynamo-electric machines MG1, MG2, MG3 provided in order to operate as a motor taking the electrical energy to be converted originating from the grid facility and to transform it into mechanical energy and/or to operate as a generator using mechanical energy produced from the aeraulic energy stored in the reservoir 20 in order to transform this mechanical energy into stored electrical energy to be returned to the grid. According to a preferred embodiment, the dynamo-electric machines MG1, MG2, MG3 are reversible motor-generators.

Figure 2:
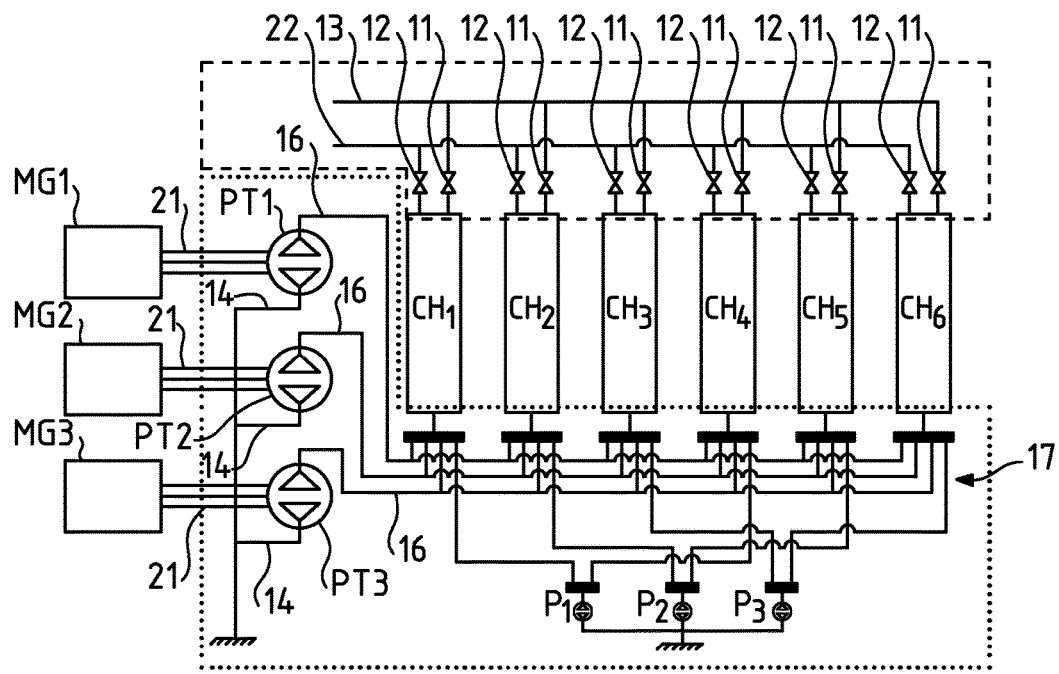
FIG. 2 is a connection diagram of the different elements of the energy conversion device according to a preferred embodiment of the invention.

The diagram of FIG. 2 is broken down into two parts: a part enclosed by dotted lines which corresponds to a purely hydraulic part and a part enclosed by dashed lines which corresponds to a purely aeraulic part.

With reference to FIG. 2, the device comprises dynamo-hydraulic machines PT1, PT2 and PT3 for respectively pumping or turbining water. In the non-limitative but preferred example, the dynamo-hydraulic machines PT1, PT2 and PT3 are reversible machines capable of operating either as pumps, in particular turbopumps, or as expanders, in particular turbines. However, the invention can be applied using specific machines for the pumping and for the expansion respectively.

The shaft of each dynamo-hydraulic machine PT1, PT2, PT3 is coupled to the shaft of the respective one of the dynamo-electric machines MG1, MG2, MG3, as shown by the reference numbers 21. The dynamo-hydraulic machines operating in pumping mode make it possible to convert the mechanical energy from the dynamo-electric machines operating as a motor into hydraulic energy by pumping a liquid drawn from a source such as the water of the surrounding aquatic environment and to push this liquid into a discharge opening 16 at an increased pressure by pumping. The dynamo-hydraulic machines operating as a hydraulic expander, in particular for turbining, make it possible to convert the hydraulic energy into mechanical energy provided at the shaft of the dynamo-electric machine operating as a generator, by turbining the liquid arriving under a certain pressure at the high pressure opening 16 and exiting the dynamo-hydraulic machine through its low-pressure opening 14 to return to a reservoir, in particular the surrounding aquatic environment.

Preferably, the dynamo-hydraulic machines can be pump-turbines of the Kaplan or Deriaz type. These pump-turbines make it possible to vary their throughput at a constant speed, which makes it possible in particular to tend towards a stabilization of the power despite the variation in the pressure during the compression of the air, and thus to limit the variation in electrical power experienced by the electric machines.

The device comprises conversion chambers CH1, CH2, CH3, CH4, CH5, CH6, each having a lower opening capable of being connected to the high-pressure opening 16 of the dynamo-hydraulic machines PT1, PT2, PT3 via a system of distribution gate valves 17, an upper opening capable of being connected via a gate valve 11 to the pipe 13 for bidirectional communication with the reservoir 20, and an upper opening capable of being connected to the open air via a gate valve 12 and a filling/draining pipe 22. In general, each conversion chamber contains air in the upper part and working liquid, typically water from the aquatic environment, in the lower part. The water present in the lower part of the chamber forms a liquid piston for compressing or expanding the air. The conversion chamber makes it possible to convert hydraulic energy into pneumatic energy and vice versa. The compressions and expansions of the air are carried out inside the conversion chambers. Preferably, enough conversion chambers are provided to continuously maintain the energy flow even while at least one conversion chamber is in the phase of filling with or draining its water. In particular, the device comprises more conversion chambers than dynamo-hydraulic machines PT1, PT2, PT3 capable of operating as a pump and more conversion chambers than dynamo-hydraulic machines PT1, PT2, PT3 capable of operating as hydraulic expanders. This feature makes it possible to maintain the activity of all the dynamo-hydraulic machines operating, depending on the case, as pumps or as turbines even during the filling or the draining of at least one conversion chamber. In the example there are twice as many conversion chambers as dynamo-hydraulic machines, thus more particularly six conversion chambers CH1-CH6 for three reversible dynamo-hydraulic machines PT1, PT2, PT3.

The device also comprises hydraulic readjustment means P1, P2, P3 for readjusting the level of liquid to its initial state in order to carry out the pumping or the turbining in the conversion chambers. They take the liquid from the same source as the dynamo-hydraulic machines PT1, PT2, PT3, in the example the surrounding aquatic environment, and return the liquid to said source. Preferably, the readjustment means are pumps (P1, P2 and P3) which operate at a small pressure difference, just enough to counterbalance the head losses and any hydrostatic pressure differential resulting from the water level in the conversion chambers in relation to the level of the source. Preferably, the readjustment means are bidirectional pumps also capable of draining or accelerating the draining of the conversion chambers when they have to be filled with air prior to a compression cycle. The distribution means 17 are designed to also ensure the selective connection of each conversion chamber CH1-CH6 to a readjustment pump P1, P2 or P3.

According to the invention, the dynamo-hydraulic means for pumping and for hydraulic expansion comprise machines PT1, PT2, PT3, which differ from each other by their respective pressure range measured in operation at their high-pressure opening 16, and which also differ by their maximum flow rate.

There are at least two dynamo-hydraulic machines, one for moderate pressures and high flow rates at the start of pumping and at the end of turbining, the other for higher pressures and lower flow rates in the more advanced phase of pumping or in the earlier phase of turbining.

In the example shown there are three different machines, namely:
 a machine PT1 for the start of the rise in pressure during the pumping and the end of the drop in pressure during the turbining, operating within a moderate pressure range and a high flow rate range;
 a machine PT2 for the end of the rise in pressure during the pumping and the start of the drop in pressure during the turbining, operating within a high pressure range and a moderate flow rate range; and
 a machine PT3 for pushing the compressed air into the reservoir 20 at the end of the storage cycle and for allowing the compressed air 20 to enter the conversion chamber at the start of the release cycle, operating within a narrow pressure range close to the pressure of the reservoir 20 and a corresponding narrow flow rate range.

It is also provided to shift the phase of the respective cycles of the conversion chambers CH1-CH6 so that the dynamo-hydraulic machines and the associated dynamo-electric machines are continuously in active conversion operation with one or other of the conversion chambers being at that time within the corresponding pressure range.

The operation of the device will now be explained and, at the same time, the description of the device and of the method will be completed.

Storage Phase

Figure 3:
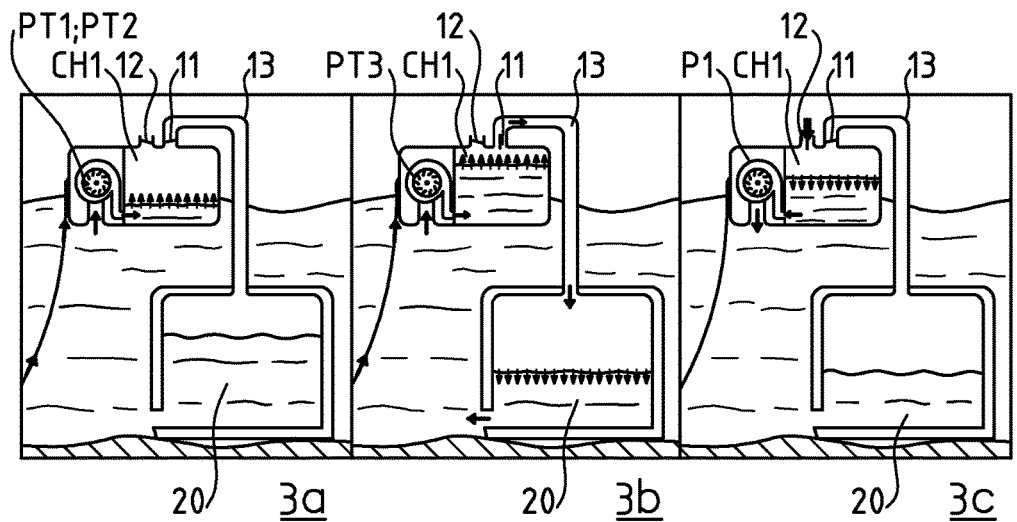
FIG. 3 is a schematic diagram of the operation of the device in the case of a conversion of electrical energy into aeraulic energy.

With reference to FIG. 3, the operation of the device during the conversion of the electrical energy into aeraulic energy in the conversion chamber CH1 will be described. FIG. 3 comprises three windows 3a, 3b, 3c respectively showing the characteristic stages of the storage phase for a conversion chamber. The windows 3a and 3b correspond to the productive stages and the window 3c corresponds to a non-productive stage, which could be called the resetting stage.

At the start (window 3a), the conversion chamber CH1 is full of air at atmospheric pressure, the water is at a minimum level. The bidirectional communication gate valve 11 and the venting gate valve 12 are closed, such that the upper part of the conversion chamber, occupied by the air, is hermetically sealed. The electrical energy to be stored supplies power to the dynamo-electric machine MG1 coupled to the dynamo-hydraulic machine PT1 which pumps the water into the conversion chamber CH1 under a moderate pressure.

At a certain intermediate stage of filling the conversion chamber CH1 with water, substantially corresponding to the maximum pressure for which the dynamo-hydraulic machine PT1 is provided, the distribution means 17 interrupt the link of the conversion chamber CH1 to the dynamo-hydraulic machine PT1 and establish the connection of the conversion chamber to the high-pressure opening 16 of the dynamo-hydraulic machine PT2 coupled to the dynamo-electric machine MG2. The electrical energy to be stored supplies power to the dynamo-electric machine MG2 coupled to the dynamo-hydraulic machine PT2 which pumps the water into the conversion chamber CH1 under an increased pressure.

When another intermediate stage of filling the conversion chamber CH1 with water is then reached, substantially corresponding to the maximum pressure for which the dynamo-hydraulic machine PT2 is provided, the distribution means 17 interrupt the link of the conversion chamber CH1 to the dynamo-hydraulic machine PT2 and establish the connection of the conversion chamber to the high-pressure opening 16 of the dynamo-hydraulic machine PT3 coupled to the dynamo-electric machine MG3. At the same time the gate valve 11 opens (window 3b of FIG. 3). The electrical energy to be stored supplies power to the dynamo-electric machine MG3 coupled to the dynamo-hydraulic machine PT3 which pumps the water into the conversion chamber CH1 under the pressure of the storage reservoir 20 until substantially all of the compressed air present in the conversion chamber CH1 has been pushed into the reservoir 20.

Owing to the dynamo-hydraulic means, the liquid, typically the water from the aquatic environment, is pumped in order to form a liquid piston in the conversion chamber in which a quantity of air is trapped. With reference to the windows 3a and 3b, the water/air interface moves from the bottom to the top of the conversion chamber, forming a piston compressing the air trapped in the conversion chamber until this air reaches the pressure prevailing in the storage reservoir.

The liquid piston has the advantage of limiting the energy losses due to friction compared with a traditional rigid piston compressor. In addition, the use of the liquid piston makes it possible to limit the heat losses, i.e. to limit the heating due to the compression, which is quasi-isothermal because of this. In order to strengthen this feature of being quasi-isothermal, the conversion chambers preferably contain heat conductors which thermally link the air and the liquid in the conversion chambers. These heat conductors are, for example, a bundle of vertical metal tubes, open at both ends, extending over substantially the whole height of each chamber. These conductors expel into the water the heat of the compression of the air in the compression cycle, which reduces the work needed for the compression, and reheat the air with heat originating from the water in the expansion cycle, which increases the work provided by the expansion of the air.

For example, for storage of air in a storage reservoir placed at a depth of 100 meters, therefore subjected to an absolute hydrostatic pressure of about 1.1 MPa, the dynamo-hydraulic machine PT1 operates within the low pressure range (atmospheric pressure to 0.3 or 0.4 MPa), the dynamo-hydraulic machine PT2 operates within the intermediate pressure range (from 0.3 to 0.4 MPa up to 1.1 MPa) and the dynamo-hydraulic machine PT3 operates within a narrow range around 1.1 MPa.

Then, with reference to the window 3c of FIG. 3, a non-productive time makes it possible to drain the water contained in the conversion chamber CH1 in order to be able to start a storage cycle in this chamber again. The bidirectional communication gate valve 11 is then closed and the venting gate valve 12 is opened. The hydraulic readjustment means are actuated in order to drain the conversion chamber until it is emptied of almost all of its water.

In this way, the conversion device carries out several pumping cycles, each cycle passing through the successive pressure ranges. The duration of a cycle is provided between 30 seconds and 5 minutes.

Release phase

Figure 4:
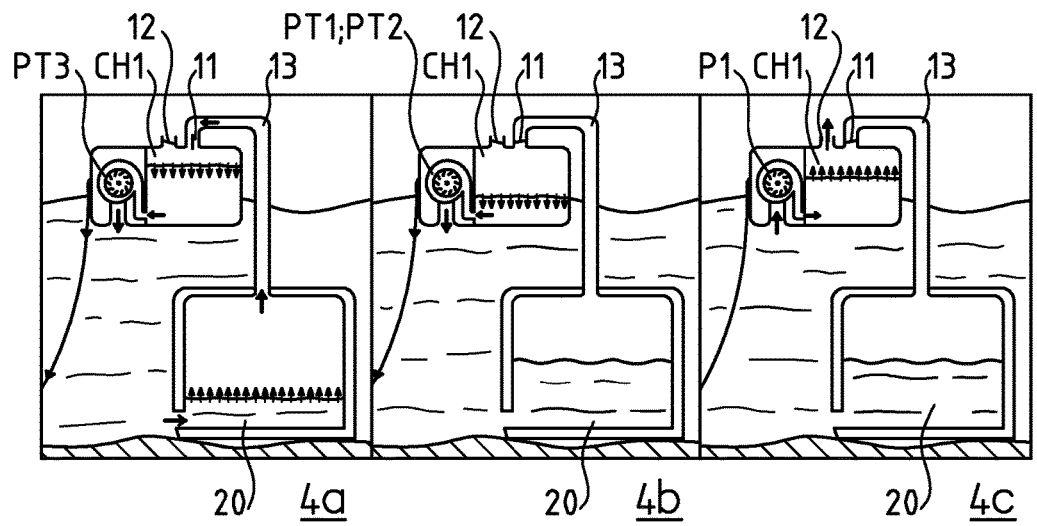
FIG. 4 is a schematic diagram of the operation of the device in the case of a conversion of aeraulic energy into electrical energy.

With reference to FIG. 4, the operation of the device during the conversion of the pneumatic energy into electrical energy will be described. FIG. 4 comprises three windows 4a, 4b, 4c respectively showing the characteristic stages of the release phase for a conversion chamber CH1. The windows 4a and 4b correspond to the productive stages and the window 4c corresponds to a non-productive or resetting stage.

At the start (window 4a), the conversion chamber is full of water. The venting means 12 are closed. For the release, the bidirectional communication gate valve 11 is opened so that the compressed air present in the storage reservoir 20 is partially transferred to the conversion chamber CH1 and a part of the water contained in the conversion chamber is pushed through the high-pressure dynamo-hydraulic machine PT3 operating as a turbine driving the dynamo-electric machine MG3 operating as a generator.

When the quantity of air present in the conversion chamber CH1 is such that this air is capable of occupying the whole volume of the conversion chamber if expanded to atmospheric pressure, the bidirectional communication gate valve 11 is closed (window 4b of FIG. 4). At the same time, the distribution means 17 interrupt the link of the conversion chamber CH1 with the dynamo-hydraulic machine PT3 and establish the link of the conversion chamber with the dynamo-hydraulic machine PT2. The air expands quasi-isothermally, continuing to push the water but now through the dynamo-hydraulic machine PT2, dedicated to medium pressures, then, after a new switchover operated by the distribution means 17, through the dynamo-hydraulic machine PT1 dedicated to moderate pressures.

It is provided to act on the dynamo-hydraulic machines in order to allow dynamic variation in certain physical variables (such as the rotational speed of the machine, the angle of the blades, the position of the distributor, etc.). It is thus possible to regulate the flow rate of the dynamo-hydraulic machines in order that the associated dynamo-electric machine operates at constant power. This regulation has the advantage of improving the power stability of the device and therefore of limiting the variations in the electrical power exchanged between the device and the electricity distribution grid.

Then, with reference to the window 4c of FIG. 4, a non-productive or resetting time makes it possible to fill the conversion chamber with water in order to start a release cycle again. The bidirectional communication gate valve 11 is then closed and the venting gate valve 12 is opened in order to allow the addition of water. The hydraulic readjustment means P1 are connected to the conversion chamber CH1 via the distribution means 17 and actuated in order to fill the conversion chamber with water.

In this way, the conversion device carries out several turbining cycles, each cycle passing through the successive pressure ranges. The duration of a cycle is provided between 30 seconds and 5 minutes.

Figures 5, 6, 7:
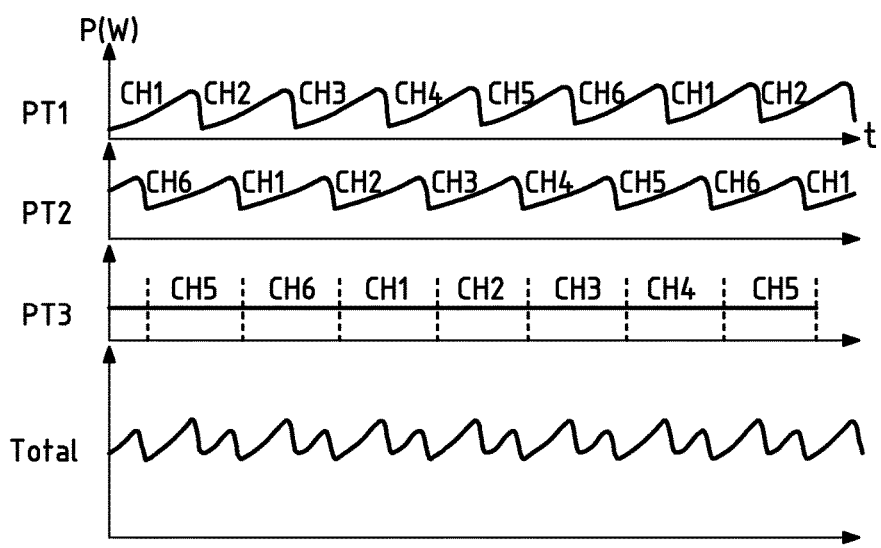
FIG. 5 is a table showing the temporal organization of the connection of the conversion chambers to the dynamo-hydraulic machines and to readjustment means, according to a preferred embodiment.
FIG. 6 is a table showing the temporal organization of the connection of the conversion chambers to the dynamo-hydraulic machines and to the readjustment means, according to a second preferred embodiment.
FIG. 7 is a timing diagram for the hydraulic powers corresponding to the table of FIG. 6.

Temporal Organization of the Connection of the Dynamo-Hydraulic Machines with the Conversion Chambers With reference to FIGS. 5 to 7, the pumping or turbining cycles of each conversion chamber are temporally offset such that at each given moment each dynamo-hydraulic machine is connected to a conversion chamber that is in the corresponding pumping or turbining phase. In other words, in the example with three pressure ranges, at all times there are three conversion chambers of which one is within the moderate pressure range, another is within the intermediate pressure range and the third is within the upper pressure range, this latter communicating with the storage reservoir 20.

The table of FIG. 5 shows an example of the temporal organization of the connection of the dynamo-hydraulic machines with the conversion chambers over a cycle, in the example of three pumps and/or turbines and six conversion chambers. Each conversion chamber (CH1, CH2, CH3, CH4, CH5, CH6) is linked successively to the three dynamo-hydraulic machines PT1, PT2, PT3 (in the example of pumping) before being linked to one of the readjustment means P1, P2 or P3. A complete cycle (twice the duration of a compression or of an expansion for one chamber) is shown there, of which each column represents a duration of ⅙ of the cycle. In this organization, each pump and/or turbine carries out its work synchronously on the chambers. The switching thereof from one chamber to another is also carried out at the same time. This organization contributes to limiting the variations in electrical power exchanged between the conversion device and the distribution grid. Moreover, this makes it possible to limit the energy losses of the thermal type.

According to another embodiment and with reference to FIGS. 6 and 7, it is provided to introduce a shift of phase between the moments of passing from one pump-turbine to another in a chamber, such that the hydraulic switchovers, corresponding to power outages, are no longer simultaneous. The table of FIG. 6 shows an example of a 1/18 shift of phase of the duration of a cycle between each pump and/or turbine. The substantially continuous operation of the pumps and/or turbines is retained, but there is now a pause for each chamber and for each passage from one pump and/or turbine to the other in each conversion chamber. Having preserved the same number of conversion chambers, the time available for returning the chamber to its initial state (by P1, P2 or P3) is reduced by the duration of the pauses produced.

In this way, the power fluctuations are even further limited. With reference to FIG. 7, an example of a timing diagram for the compression hydraulic powers envisaged for a device with three pumps, the last of which works only at constant pressure and power, is shown. There is a 1/12 shift of phase of the cycle between the pump 1 and the pumps 2 and 3. The pumps 1 and 2 make it possible to reach the storage pressure and the pump 3 makes it possible to push the compressed air to the reservoir. Shifting the phase of the switching of the pumps makes it possible to limit the fluctuations in the resulting total hydraulic power and therefore makes it possible to limit the fluctuations in the total electrical power.

Of course, the invention is not limited to the examples which have just been described, and numerous adjustments can be made to these examples without exceeding the scope of the invention.

Of course, the different features, forms, variants and embodiments of the invention can be combined together in various combinations unless they are incompatible with each other or mutually exclusive. In particular, all of the variants and embodiments described previously can be combined together.

Embodiment examples have been shown with three dynamo-hydraulic machines PT1, PT2 and PT3, which can be three separate pumps and three separate turbines or can be three pump-turbines. The device can comprise a number of pumps and/or turbines other than three. According to other embodiments, it is provided that there are different numbers of pumps and expanders.

One or more additional systems, for example electrical capacitors, can be added in order to smooth out the electrical power consumed (or provided for the release).

Similarly, the number of conversion chambers can be different from that indicated in the example. However, it is desirable to have at least one more of them than the number of pumps or turbines. The number of chambers is not necessarily a multiple of the number of pumps and/or turbines.

With respect to the readjustment means, the use of one or more other technologies, combined or not, can be envisaged to carry out the filling or the draining of the conversion chambers. There may be mentioned in particular the use of hydraulic ejectors, the natural use of gravity or the recovery of potential energy present in another chamber.

The bidirectional communication means can comprise separate paths for the air going to the storage reservoir 20 and coming from the storage reservoir 20, optionally with each one having its gate valve instead of the common gate valve 11.

The invention claimed is:

1. An energy conversion device for converting electrical energy into aeraulic energy and vice versa, and for storing this in the form of compressed air, the device comprising:
dynamo-electric machines which have an electrical power link to a grid;
dynamo-hydraulic machines mechanically linked to the dynamo-electric machines;
at least one conversion chamber capable on the one hand of containing liquid pumped by the dynamo-hydraulic machines operating as pumps or receiving liquid intended to supply power to the dynamo-hydraulic machines operating as expanders, and on the other hand of containing air, such that the liquid present in the chamber forms a liquid piston for compression or expansion of air;
a reservoir for storing compressed air at a storage pressure;
sealable means for bidirectional aeraulic communication between the conversion chambers and the storage reservoir; and
each dynamo-hydraulic machine is provided in order to operate within a respective pressure range at its high-pressure opening in order to carry out the pumping or the hydraulic expansion in stages inside each conversion chamber successively with several said dynamo-hydraulic machines up to or, respectively, from the desired storage pressure, the pressure range being narrower than the difference between the low pressure and the storage pressure, and in that distribution means are provided to connect each conversion chamber successively to at least two dynamo-hydraulic machines provided in order to operate within different pressure ranges.

2. The device according to claim 1, characterized in that at least one dynamo-hydraulic machine is provided in order to operate within a narrow pressure range substantially corresponding to the pressure of the storage reservoir.

3. The device according to claim 1, characterized in that the dynamo-hydraulic machines are mounted hydraulically in parallel with each other between a low-pressure liquid source and the at least one conversion chamber.

4. The device according to claim 1, characterized in that the storage reservoir is underwater and open in the lower part to receive water from the aquatic environment, enclosing a pocket of air at a pressure defined by the submersion depth of the reservoir.

5. The device according to claim 1, characterized in that, to carry out the conversion of the electrical energy into aeraulic energy and vice versa, several cycles of pumping or turbining respectively are provided, each cycle passing through the successive pressure ranges.

6. The device according to claim 1, characterized in that it comprises at least two conversion chambers in order to continuously maintain the energy flow in the dynamo-hydraulic machines.

7. The device according to claim 6, characterized in that the cycles of varying the level of liquid in the conversion chambers are phase shifted between conversion chambers, each dynamo-hydraulic machine being connected successively to several conversion chambers which have a time offset within the pressure range corresponding to this dynamo-hydraulic machine.

8. The device according to claim 1, characterized in that a pause is provided at the time when the at least one conversion chamber passes from one dynamo-hydraulic machine to another.

9. The device according to claim 1, characterized in that it comprises hydraulic readjustment means for readjusting the level of liquid to its initial state in order to carry out the pumping or the turbining in the at least one conversion chamber.

10. The device according to claim 1, characterized in that it comprises more conversion chambers than dynamo-hydraulic machines.

11. The device according to claim 1, characterized in that the dynamo-hydraulic machines are of the pump-turbine type capable of operating as a pump or, conversely, as a turbine.

12. The device according to claim 11, characterized in that the dynamo-hydraulic machines are pump-turbines of the Kaplan or Deriaz type.

13. The device according to claim 1, characterized in that the dynamo-electric machines are reversible motor-generators.

14. The device according to claim 1, characterized in that the bidirectional communication means are closed, except for during a final phase of compression and during an initial phase of expansion.

15. A method for converting electrical energy into aeraulic energy and vice versa, in which:
a liquid is pumped, forming a liquid piston in a conversion chamber in which a quantity of air is trapped until this air reaches a pressure of a compressed air storage reservoir, then the compressed air is transferred from the conversion chamber to the storage reservoir; and/or
a liquid is turbined by allowing compressed air to enter a conversion chamber containing a quantity of liquid such that the liquid is pushed through a turbine;
the pumping or the turbining of the liquid is carried out successively at least in two stages of pumping or, respectively, turbining provided to take place within different pressure ranges.

16. The conversion method according to claim 15, characterized in that, during the turbining and after having allowed a quantity of compressed air to enter the conversion chamber still containing water, the inlet for compressed air originating from the storage reservoir is closed, and the compressed air present in the conversion chamber is expanded, while the remaining liquid is pushed back in order to be turbined.

17. The conversion method according to claim 15, characterized in that:
the liquid is pumped by dynamo-hydraulic machines driven by at least one electric motor operating with electrical energy originating from an electricity grid; and
the liquid is turbined by dynamo-hydraulic machines which drive an electric generator in order to generate electrical energy returned to the grid.

18. The conversion method according to claim 15, characterized in that:
during the pumping and after having transferred the compressed air into the storage reservoir, the liquid contained in the conversion chamber is drained; and
during the turbining and after having expanded the air contained in the conversion chamber, said chamber is filled with liquid again.

19. The conversion method according to claim 15, characterized in that the compression of the air and/or the expansion of the air in the at least one conversion chamber is quasi-isothermal.

* * * * *